Patented Dec. 26, 1950

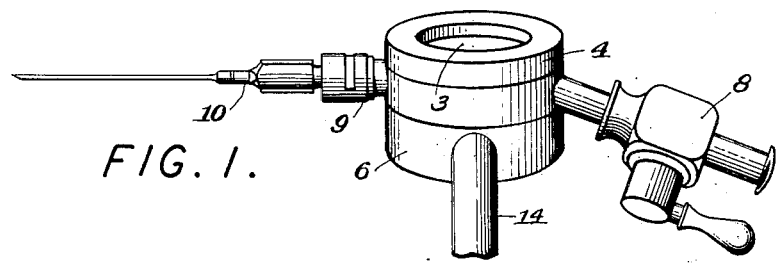
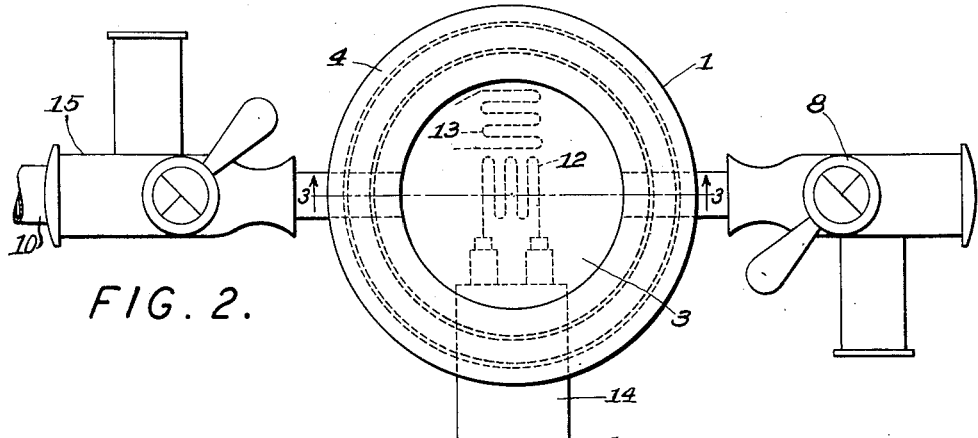
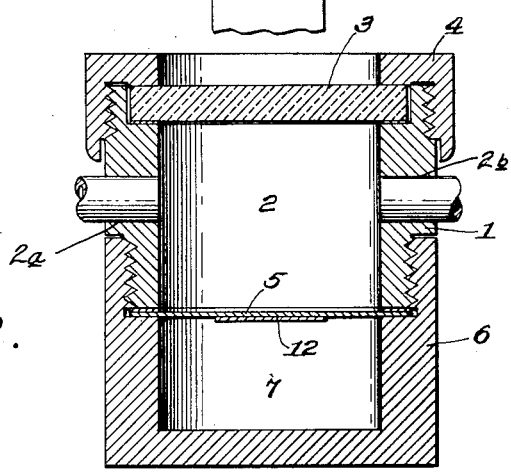
INVENTOR
HOWARD R. BIERMAN
BY
ATTORNEY

2,535,998

UNITED STATES PATENT OFFICE 2,535,998

HYPODERMIC PRESSURE MANOMETER

Howard R. Bierman, San Francisco, Calif.

Application November 15, 1949, Serial No. 127,289

5 Claims. (Cl. 73—389)

This invention relates to a hypodermic pressure manometer for measuring intravascular blood pressures and pulse beat.

Various arrangements have been heretofore suggested and used in an effort to determine intravascular blood pressures, but the same have had definite limitations either structurally, functionally, or economically thereby limiting either their range of application and usefulness or their dependability.

One object of my invention is to provide an improved hypodermic manometer that is relatively simple but highly effective in determining intravascular blood pressures over long periods of time.

Another object of my invention is to provide an improved hypodermic manometer that has a relatively small fluid capacity, a high degree of mobility, extreme accuracy, variable frequency and sensitivity, freedom from changes of body and ambient temperatures, and rapid and simple electrical calibration and standardization.

A further object is to provide an improved hypodermic manometer that has the foregoing characteristics, that allows the pulse beat to be visually observed, and that provides a multiple infusion or flushing arrangement.

Other objects and advantages will be apparent to those skilled in the art from the following description of the accompanying drawings in which:

Fig. 1 is a perspective of my improved manometer;

Fig. 2 is an enlarged plan view of my manometer; and

Fig. 3 is an enlarged vertical section taken substantially on the line 3—3 of Fig. 2.

In the particular embodiment of the invention disclosed herein, I have provided a cylindrical, preferably stainless steel, casing 1, having a pressure and pulse beat chamber 2 closed at one end by a transparent disc 3 such as Lucite, glass, or the like, held by a threaded ferrule 4. The other end of the chamber is closed by a diaphragm 5, preferably stainless steel, clamped in position by a cap 6 threaded on to casing 1 thereby forming a gage chamber 7. The pressure and pulse beat chamber 2 has two diametrically opposed openings 2a and 2b. One opening leads directly into a standard three-way stopcock 8 which is an integral part of the device and functions as a flushcock. The other opening leads into a Luer lock 9 accommodating any standard needle 10 or similar fitting, the needle being inserted into the vascular system of the patient. To show the relatively small size of both the device and the capacity of pressure chamber 2, devices of this type have been made in which the chamber 2 is approximately 2.8 cm. in diameter and 1.5 cm. deep, the transparent disc 3 is 0.45 cm. thick, and the stainless steel diaphragm 5 is 0.02 cm. thick with a surface area of approximately 2.8 sq. cm. Strain responsive impedance means, specifically consisting of bonded wire type strain gages such as shown in Patent No. 2,292,549, diagrammatically indicated at 12 and 13, are secured to the under-surface of diaphragm 5 so as to be responsive to changes in diaphragm strains arising from pressure variations in chamber 2. The gage 12 is preferably centered on the diaphragm so as to be pressure responsive and the gage 13 is placed tangentially near the diaphragm edge to obtain temperature compensation. Electric conductors 14 extend through a suitable opening in the side of cap 6 for connection to the strain gage 12. An oscillograph or other measuring instrument is used to record changes in electrical output of the strain gage in response to strain changes.

In operation, the pressure and pulse beat chamber 2 is filled with a proper solution, such as heparin-saline, to completely exclude air. This is accomplished by running the solution, from a suitable reservoir placed at a desirable height, through the flushcock 8 into the chamber while the air is allowed to escape through needle 10. After the stopcock and chamber 2 are filled with the solution to a pressure in excess of the intraarterial pressure, the chamber 2 is shut off from the reservoir by closing stopcock 8. If desired, the flow from the reservoir can be regulated so that the needle and chamber are kept filled with the solution to avoid clotting. However, to record arterial pressure, the chamber 2 is shut off from the solution by closure of stopcock 8. Arterial pressure is then transmitted through needle 10 to the heparin-saline solution in the pressure chamber thereby distending the diaphragm 5 which in turn causes the resistance of strain gage 12 to change. When actual recordings are not necessary it is best to allow a slow drip of the solution to flow through the needle to maintain its patency. The transparent disc allows the pulse beat to be observed by reason of blood particles passing through the needle to the small volume chamber 2 and remaining suspended in the solution within the chamber. These particles will oscillate, in response to the pulse beat, sufficiently to be observed through the transparent window. The chamber thus performs simultaneously the dual functions of determining arterial pressure and pulse beat.

The whole apparatus is calibrated initially and need be done only once. For each thickness of diaphragm and strain gage unit, increasing known pressures are applied to the diaphragm and the output current of the strain indicator is recorded. If a standardization at ambient atmospheric pressure is desired at that time, a stopcock 15 which is used in the standardization in place of needle 10 should be opened to room pressure and stopcock 8 should be closed both to the chamber and to the fluid infusing the instrument. Therefore, the chamber is at equilibrium with the ambient pressure and unaffected by either the blood pressure of the infusion pressure. The standardization produces a known output gage current which represents a known pressure. Since the current-pressure relationship is linear, calculation of the actual systolic and diastolic pressure is a matter of simple proportions. For example, with one unit 3.2 milliamperes of output current is equivalent to 120 millimeters of mercury pressure when the strain indicator is at 40 microns or micro inches maximum sensitivity (Fig. 3). If, during a recording, a 3.6 centimeter deflection is obtained on standardization, then 3.6 centimeters is equivalent to 120 millimeters pressure. If the blood pressure measures 4.2 centimeters from the base line or atmospheric pressure at the peak of systole, and 2.6 centimeter at diastole, then the blood pressure is 139/86 mm. Hg. The entire standardization procedure can be completed within three seconds, permitting frequent checks during an experiment. If desired the second three-way stopcock 15 may be used to assist in flushing, calibration or other operations. For example, both stopcocks may be used with needle 10 on the end of the stopcock 15. This is not shown in Figure 1, but is apparent from Figure 2. While recording pressures, stopcock 15 is open from the blood vessel through the needle to the pressure chamber 2. Stopcock 8 is now closed to both ambient air and the infusing reservoir. When not recording, the stopcock 8 is open to the infusing reservoir previously referred to as located at a proper height and leading to the chamber, and then through the stopcock 15 and needle 10 into the blood vessel, thus maintaining patency for the time until the record is desired to be taken.

When calibration to the ambient air is desired, stopcock 15 is open to the ambient air so that now chamber 2 is open to the ambient air through stopcock 15. Stopcock 8 is closed to the ambient air and the reservoir with the infusing solution. Of course, it is optional to use the stopcocks as described but it has proved to be of great advantage to the practical operation of this instrument since not infrequently one wishes to flush out the needle, check ambient air pressures, draw blood samples, and even give solutions through this device. It thus gains versatility in operation which is an important factor for its practical use.

As a result of my improved hypodermic manometer, the intravascular blood pressure may be determined in a simple and accurate manner over many hours without any adverse effects from body or ambient temperatures. The small fluid capacity of chamber 2, for the specific dimensions of the device given, requires a volume change of less than ten cubic millimeters to record 100 millimeters of mercury. The small size of the instrument and the flexible leads for electrical recording permits a highly desirable degree of mobility for relatively long studies. Many different sensitivities or frequencies, but not necessarily both, can be obtained by selecting the proper thickness of diaphragm. Such diaphragms, to which gages have already been cemented, can be substituted easily and quickly. It is thus seen that I have provided a very effective device for the purposes described and one that has considerable practical value.

It will, of course, be understood by those skilled in the art that various changes may be made in the construction and arrangement of parts without departing from the spirit of the invention as set forth in the appended claims.

I claim:

1. A hypodermic intravascular pressure manometer and pulse beat device comprising, a casing having a chamber adapted normally to contain a pressure transmitting solution, a diaphragm for closing one end of said chamber, strain responsive electrical impedance means mounted on the surface of said diaphragm on the outside of said chamber whereby pressure changes in the chamber effect changes in impedance, a transparent closure member for the other end of said chamber, openings in said chamber one of which is to admit said solution to the chamber to completely fill the same and the other of which is adapted for connection to a hypodermic needle.

2. The combination set forth in claim 1 further characterized in that the opening through which the solution is admitted to the chamber is provided with a three-way stopcock adapted to allow said chamber selectively to communicate with a source of the solution through the stopcock or with the atmosphere or to entrap the solution within the chamber.

3. The combination set forth in claim 1 further characterized in that the electrical impedance strain gage means comprises a wire type strain gage bonded throughout its effective length to the outside of the diaphragm.

4. The combination set forth in claim 1 further characterized by the provision of a diaphragm clamping element having threaded connection with the casing whereby the diaphragm may be readily removed or inserted.

5. The combination set forth in claim 1 further characterized by the provision of a cap having threaded engagement with the casing and adapted to clamp the diaphragm in position against the casing, said cap having a chamber that is disposed on the outer side of the diaphragm for containing lead wires connected to the gage.

HOWARD R. BIERMAN.

REFERENCES CITED

The following references are of record in the file of this patent:

UNITED STATES PATENTS

| Number | Name | Date |
| --- | --- | --- |
| 2,002,008 | Harris, Jr. | May 21, 1935 |
| 2,096,831 | Wappler | Oct. 26, 1937 |
| 2,376,156 | Kuehni | May 15, 1945 |
| 2,400,467 | Ruge | May 14, 1946 |
| 2,472,045 | Gibbons | May 31, 1949 |

FOREIGN PATENTS

| Number | Country | Date |
| --- | --- | --- |
| 227,199 | Germany | Oct. 17, 1910 |

OTHER REFERENCES

Proc. of the Soc. for Experimental Biology and Medicine, page 53, vol. 56, #1, May 1944.